United States Patent
Hatcher

[11] 3,841,529
[45] Oct. 15, 1974

[54] AGRICULTURAL PLANTER
[75] Inventor: John C. Hatcher, Charlotte, N.C.
[73] Assignee: Cole Manufacturing Company, Charlotte, N.C.
[22] Filed: Sept. 12, 1972
[21] Appl. No.: 288,283

[52] U.S. Cl................. 222/177, 222/242, 222/410, 221/167, 221/203, 221/277
[51] Int. Cl............................................ A01c 15/00
[58] Field of Search ........... 221/167, 203, 277, 168; 222/177, 168.5, 172, 410, 411, 237, 273, 274, 242; 111/77, 78

[56] References Cited
UNITED STATES PATENTS

| | | | |
|---|---|---|---|
| 556,551 | 3/1896 | McKee | 222/177 |
| 780,106 | 6/1905 | Jones | 111/77 |
| 2,297,642 | 9/1942 | White | 222/242 |
| 2,468,023 | 4/1949 | Blue | 222/177 |
| 3,486,659 | 12/1969 | Beebe et al. | 221/277 |
| 3,702,663 | 11/1972 | Joele | 221/167 |

Primary Examiner—Robert B. Reeves
Assistant Examiner—H. Grant Skaggs
Attorney, Agent, or Firm—Parrott, Bell, Seltzer, Park & Gibson

[57] ABSTRACT

An improved seed dispenser for an agricultural planter in which a seed plate is supported in predetermined spaced relation from other components of the planter so as to assure ease of operation and long operating life.

5 Claims, 4 Drawing Figures

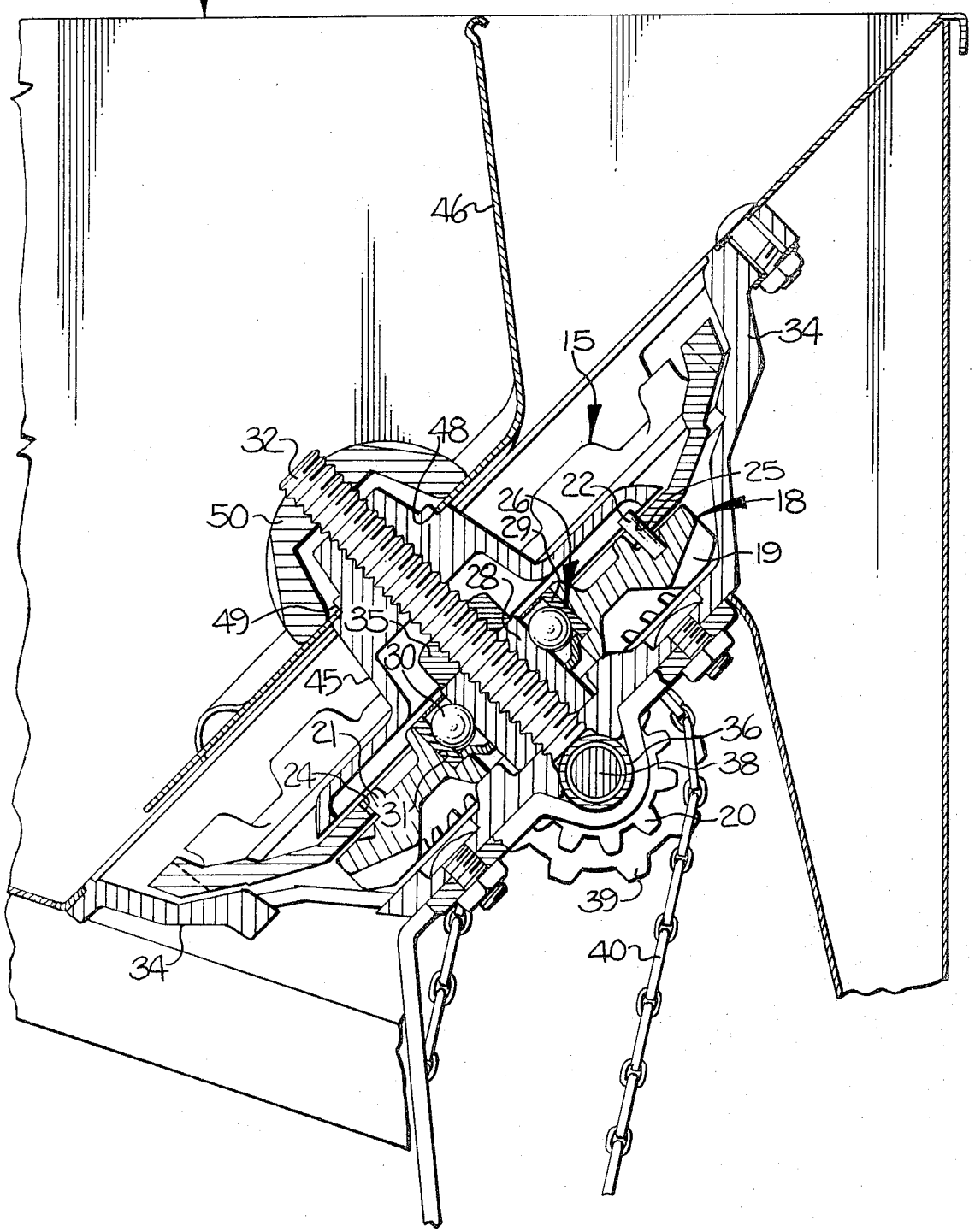

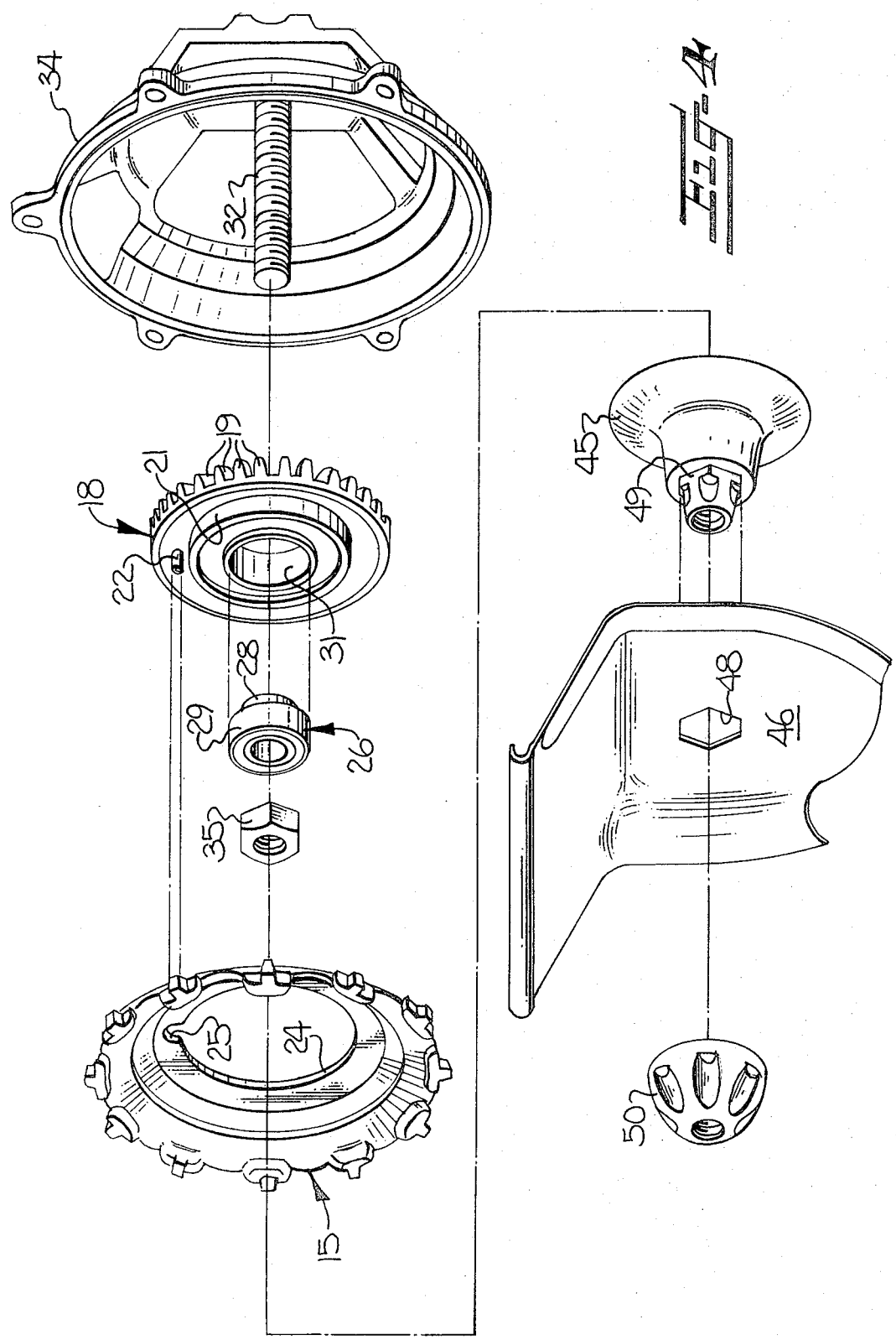

AGRICULTURAL PLANTER

Agricultural seed planters have heretofore been provided with hoppers for receiving and containing seed to be dispensed, ground wheels for engaging the surface of ground over which the planter moves, and seed dispensers which operate in conjunction with the ground wheels for dispensing seed in coordination with movement of the planter over ground to be planted. In many such prior arrangements, interchangeable seed plates have been provided to accommodate planting of varying types of seed from time to time. In accommodating the mounting of such seed plates, reliance has been placed upon direct contact of a seed plate with underlying and supporting components of the seed dispensing arrangement for locating the seed plate in proper position. Where rubbing engagement with such a support occurs, the seed plate and support quickly become sufficiently worn to cause difficulty in properly locating the seed plate and interference with proper operation of the planter.

It is an object of this invention to overcome the difficulties and deficiencies of prior agricultural planters by providing that a seed plate of a seed dispensing means be supported in predetermined spaced relation from other components of the planter. By so supporting a seed plate, ease of operation and long operating life are facilitated.

A further object of this invention is the provision of an arrangement for restraining otherwise excessive looseness of a seed plate so as to avoid jamming of the seed plate while accommodating ease of adjustment during transitions from one variety of seed to another. In realizing this object of the present invention, the clearance space available for the positioning of the seed plate is determined by adjustment of a clearance means held in spaced relation to the seed plate location.

Some of the objects and advantages of the invention having been stated, others will appear as the description proceeds, when taken in connection with the accompanying drawings, in which;

FIG. 3 is an enlarged elevation view, partially in section, through the hopper of the planter of FIG. 1, taken generally along the line 3—3 in FIG. 2; and FIG. 4 is an exploded perspective view of certain components of the planter of FIGS. 1-3.

The present invention will be described hereinafter with particular reference to the accompanying drawings which show a preferred embodiment for the present invention. It is to be understood at the outset, however, that the drawings and description are for illustrative purposes only and are to be construed broadly as it is contemplated that variations in detail may be made in practicing the present invention.

Figure 1:
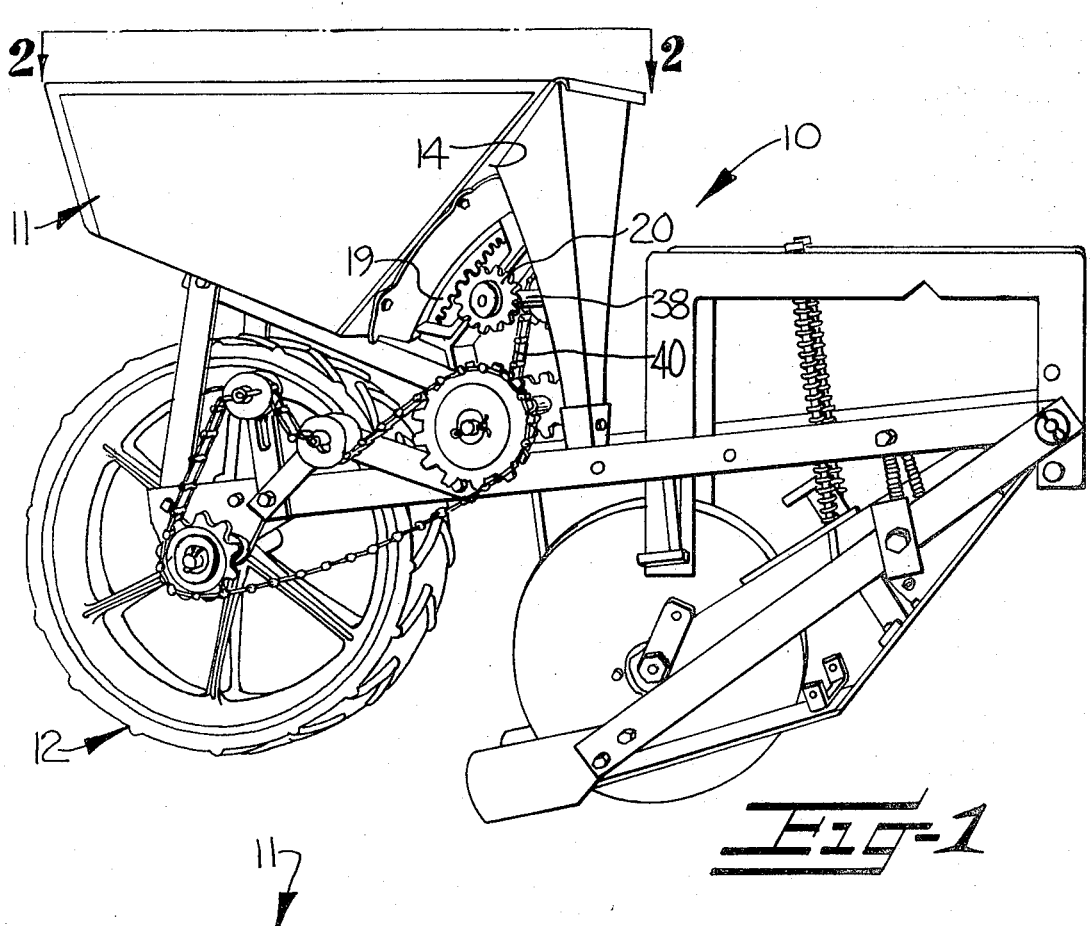
FIG. 1 is a perspective view of a planter incorporating the present invention.

The planter generally indicated at 10 in FIG. 1 includes a hopper means generally indicated at 11 and a ground wheel means generally indicated at 12. The ground wheel means 12 and hopper 11 are supported from frame members, which may be constructed and arranged in accordance with the disclosure of U.S. Pat. No. 3,598,069. Inasmuch as a fully detailed disclosure of the general structure and arrangement of the planter 10 is available in that prior patent, such disclosure will not be repeated at length here.

Figure 2:
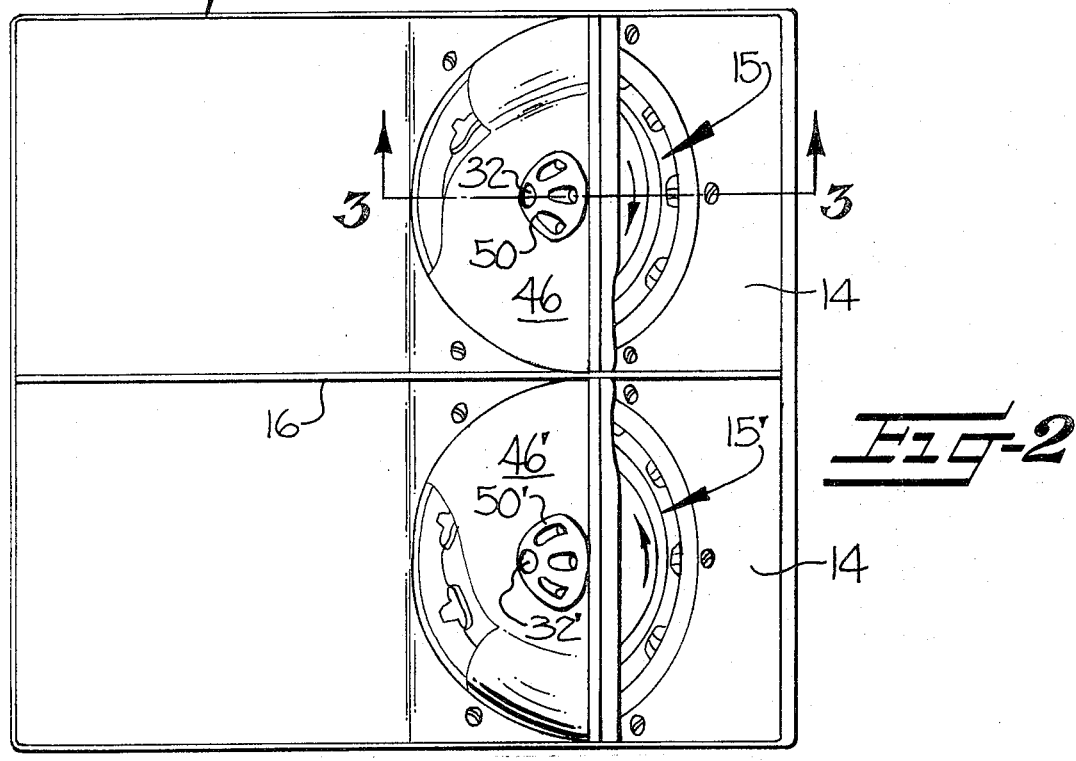
FIG. 2 is a plan view of the hopper portion of the planter of FIG. 1, taken generally as indicated by the line 2—2 in that figure.

As illustrated, the hopper means 11 has an angled front wall 14. In accordance with this invention, a seed plate means generally indicated at 15 is disposed adjacent the front wall 14 of the hopper means 11, for successively selecting and discharging seed to be planted. The planter 10 illustrated in FIGS. 1 and 2 has a hopper means 11 of the type known as a duplex hopper. The planter 10 is so known due to the presence of first and second seed plate means 15, 15', separated one from the other by a central dividing wall 16. In the description which follows, reference will be had to only one of the seed plate means 15, with it being understood that the structure of the other seed plate means 15' is identical except that the seed plate means is driven in rotation in an opposite direction. In duplex hoppers such as that provided for the planter 10, seeds are delivered in alternation from first one seed plate means and then the other. Inasmuch as the present invention is contemplated as being useful in duplex hoppers and other seed dispensing means, it is not deemed necessary to extend further the description of the duplex hopper. Where corresponding structure of the two portions of the duplex hopper is illustrated, prime notation is applied to the components of the second portion of the hopper, not here described in detail.

The seed plate means 15 is mounted within the hopper 11 by a drive plate means 18. In particular, the drive plate means 18 is formed to have a peripheral bevel gear portion 19 which engages with a drive gear 20 as described more fully hereinafter. By means of a machined circular lip portion 21 and a projecting drive pin 22 positioned in a predetermined location on the drive plate 18, the seed plate means 15 is engaged, supported and driven in rotation.

More particularly, the seed plate means 15 is formed as a shallow dished conical member defining a generally circular central opening 24 therewithin. The inwardly facing circumferential wall of the opening 24 engages the machined lip portion 21 of the drive plate means, so that the seed plate means is supported from the drive plate means. Further, a radially outwardly extending notch portion 25 in the seed plate means 15 receives the pin 22 of the drive plate means 18, so that the seed plate 15 is driven in rotation by the drive plate. The fit of the seed plate to the pin 22 and drive plate, being between machined surfaces, is maintained with greater accuracy than has heretofore been the case with unmachined components, thereby improving accuracy of seed dispensing.

Both the seed plate and the drive plate are supported by bearing means 26 engaging the drive plate means 18. As illustrated, the bearing means 26 preferably is an anti-friction bearing having an inner race 28, an outer race 29 and anti-friction elements 30 interposed between the races. The outer race 29 is received with a slight press sit in a central recess 31 formed in the drive plate 18. The central recess 31 is provided with a depth seating shoulder (FIG. 3), so that the drive plate means 18 is positioned in predetermined relation to the bearing means 26 on full seating of the outer race 29 into the drive plate.

The inner race 28 of the bearing means 26 is penetrated by a mounting stud 32, which thus extends centrally through the drive plate means 18 and the seed plate means 15. Additionally, the inner race 28 is drawn into engagement with a seating recess within a drop plate means 34 which encircles the seed plate 15 and which is mounted to the forward wall 14 of the hopper. The inner race 28 is maintained in engagement with the drop plate means 34 by a lock nut 35 mounted on the stud 32. By such positive positioning of the inner race of the bearing, the drive plate means 18 and the seed plate means 18 are precisely and positively located relative to the drop plate means 34. Due to the bending rigidity of the stud 32, the seed plate is maintained in its desired plane of inclination during use.

In accordance with an important object of this invention, the seed plate means 15 is thus supported out of contact with the drop plate means 34 and in predetermined spaced relation thereto. By being maintained out of contact with the drop plate means 34, the seed plate 15 more easily rotates and has an extended operating life in that rubbing wear is avoided. Additionally, the size and movement of seed cells defined between the drop plate means 34 and the seed plate means 15 (as described more fully hereinafter) is more positively and accurately controlled.

Preferably, the stud 32 is secured in place in the drop plate means 34 by threaded engagement with an opening provided therein. Further, an end of the stud 32 within the drop plate means 34 abuts a sleeve 36 which receives a cross shaft 38. The cross shaft 38 is driven in rotation by connection, through a sprocket 39 and chain 40, with the ground wheel 12. A drive gear 41 mounted on the shaft 38 engages the beveled portion 19 of the drive plate means 18 to coordinate rotation of the drive plate means with movement of the planter 10 over ground to be planted.

It is to be understood that the positioning of the drive plate means as described to this point is established and maintained by components of the seed dispensing means which are maintained in assembled relation irrespective of the particular seed plate installed or the variety of seed to be dispensed. Further, the arrangement of this invention is particularly constructed and arranged to facilitate interchange of seed plates or adjustment to accommodate proper operation of a selected seed plate.

The drop plate means 34 cooperates with the seed plate means 25 disposed therewithin in the selection and dispensing of seed, in that moving seed cells are defined therebetween and the drop plate means 34 defines an opening through which seed lifted by rotation of the seed plate is discharged into a drop chute 42. Preferably, the stud 32 is positioned relative to the conical interior wall of the drop plate means 34 so as to be slightly eccentric relative thereto. That is, the stud 32 is displaced from the central axis of the generally conical inner wall surface of the drop plate means 34, in a direction away from the side along which the seed plate means 15 moves upward in transporting seed to be dispensed. By such a slight displacement, the seed cells defined between the seed plate means 15 and the drop plate means 34 have an enlarging configuration during movement of seed toward the dispensing location. Such an enlarging configuration facilitates selection and dropping of seed to be dispensed.

As will be understood, excessive looseness of the seed plate means 15 on the drive plate means 18 conceivably could introduce undesirable variations in seed cell size. Such excessive looseness and cell size variation may cause jamming of the seed plate or misplanting of seed. For these reasons, provision is made for establishing an adjustable clearance space for operation of the seed plate means 15. A clearance member 45 is threadingly engaged with the stud 32 and has a generally circular flange portion arranged to extend closely adjacent the seed plate means 15. By rotation of the clearance space means 45 relative to the stud 32, the clearance space means may be moved toward or away from the drive plate means 18. Thus, the space available between the flange portion of the clearance space means 45 and the drive plate means 18 may be adjusted to accommodate seed plates of varying thicknesses while restraining the seed plate against otherwise excessive looseness.

When a desired adjusted position is obtained for the clearance adjustment means 45, that means is locked against rotation relative to the stud 32 by a baffle 46 which engages the side walls of the hopper means 11. The baffle 46 has a multisided opening 48 therein which receives and engages a mating multisided lock portion 49 of the clearance space means 45. A cap member 50 may then be threaded onto the stud 32 to secure the baffle 46 in its assembled position.

Should it be necessary for an operator using the planter 10 to interchange seed plates or adjust the clearance space for a seed plate to obtain proper operation, it is only necessary that the operator loosen the cap member 50, disengage the opening 48 of the baffle 46 from the clearance adjustment member 45, and remove or rotate the clearance adjustment member 45 as may be necessary.

In the drawings and specification, there has been set forth a preferred embodiment of the invention, and although specific terms are employed, they are used in a generic and descriptive sense only and not for purposes of limitation.

That which is claimed is:

1. An improved seed dispensing means for an agricultural seed planter having hopper means for receiving and containing seed to be dispensed and ground wheel means for engaging the surface of ground over which the planter moves, the seed dispensing means comprising:

drop plate means mounted on said hopper means for defining a seed drop opening through which seed is delivered, stud means extending from said drop plate means into said hopper means, antifriction bearing means having an inner race engaging said stud means and said drop plate means and an outer race encircling said inner race, drive plate means mounted on said bearing means outer race for rotation relative to said drop plate means, seed plate means mounted on said drive plate means for rotation therewith, said drop plate means and said seed plate means each defining a conical surface extending upwardly from said stud means said bearing means and said drive plate means cooperating for mounting said seed plate means in predetermined spaced relation to said drop plate means and accurately positioning selected seed plate means installed in the seed planter, said seed plate means and said drop plate means cooperating on rotation of said seed plate means for selecting and dispensing seed while avoiding rubbing contact between said seed plate means and said drop plate means, and adjustable clearance means penetrated by said stud means and disposed in spaced relation from said drive plate means for establishing an operating clearance for rotation of said seed plate means with said drive plate means, for restraining said seed plate means from disengagement from said drive plate means, and for adjustably varying the operating clearance as required for alternate seed plate means.

2. A planter according to claim 1 wherein said drive plate means and said seed plate means have mating engagement means for driving engagement of said seed plate means with said drive plate means.

3. A planter according to claim 1 wherein said restraining means comprises an adjustable clearance means engaging said stud means for movement relative to said drive plate means and for establishing a clearance space from said drive plate means for reception of said seed plate means so that said seed plate means can be interchanged while avoiding jamming thereof by seed in said hopper means.

4. A planter according to claim 1 wherein said stud means is threaded and said restraining means engages the threads of said stud means for accommodating ready adjustment of the clearance space provided for said seed plate means.

5. In an agricultural seed planter having a hopper means for receiving and containing seed to be dispensed, ground wheel means for engaging the surface of ground over which the planter moves, and seed dispensing means for releasing seed from said hopper means and including drop plate means for defining a seed drop opening through which seed is delivered and seed plate means for rotation relative to said drop plate means in coordination with rotation of said ground wheel means for selecting and delivering seed, said drop plate means and said seed plate means each defining a conical surface extending upwardly from the axis of rotation of said seed plate means an improvement which facilitates avoidance of rubbing contact between said seed plate means and said drop plate means and of seed plate means jamming otherwise possibly occurring, the improvement comprising:

drive plate means for mounting said seed plate means in spaced relation to said drop plate means and for driving said seed plate means in rotation, antifriction bearing means for mounting said drive plate means for rotation and having an outer race engaging said drive plate means and an inner race with a lower part engaging said drop plate means adjustable clearance means for establishing an operating clearance for rotation of said seed plate and for restraining said seed plate against disengagement from said drive plate means, and fastener means penetrating said bearing means and said adjustable clearance means and cooperating therewith for maintaining said drive plate means in predetermined relation to said drop plate means and said adjustable clearance means in predetermined relation to said drive plate means for thereby maintaining said seed plate means out of frictional contact with said drop plate means.

* * * * *